United States Patent Office 3,468,910
Patented Sept. 23, 1969

3,468,910
METHOD FOR PURIFYING 6-(AND 7-) CARBOXY-2-METHYLOL-1,4-BENZODIOXANE
Arnold Fricevich Alksnis, Ul. Raunas 45, kv. 20, and Janis Aleksandrovich Surna, Ul. Maza Kaiju 3, kv. 3, both of Riga, U.S.S.R.
No Drawing. Filed July 9, 1965, Ser. No. 470,876
Int. Cl. C07d 15/18
U.S. Cl. 260—340.3                              7 Claims

ABSTRACT OF THE DISCLOSURE

A method for obtaining pure 6- and 7-carboxy-2-methylol-1,4-benzodioxane by reacting equimolar amounts of sodium protochatechuate and epichlorohydrin at 40–45° C. for about 2 hours to form a mixture of the sodium salts of 6- and 7-carboxy-2-methylol-1,4-benzodioxanes. The mixture is treated with aqueous orthophosphoric acid for up to 12 hours to free the desired acids from their sodium salts and precipitate them. The freed, precipitated acids are recrystallized from hot water.

---

This invention relates to methods for preparing 6-(and 7-) carboxy-2-methylol-1,4-benzodioxane. The process is accomplished according to the reaction of the following equation:

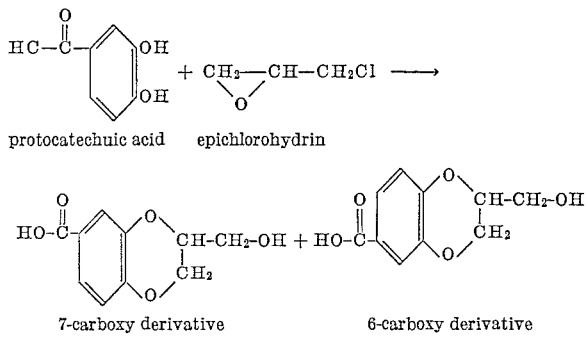

The reaction is effected in the presence of NaOH and involves the subsequent precipitation of a mixture of the two formed compounds with hydrochloric acid.

The prior art method for preparing 6- (and 7-) carboxyl-2-methylol-1,4-benzodioxane follows the procedure described hereinabove and makes use of hydrochloric acid to precipitate the resulting acids. The mixture of precipitated acids is filtered, dried, dissolved in $CH_3OH$ had esterified, using anhydrous HCl as the catalyst, after which the obtained methyl esters of the carboxy compounds are distilled and saponified by boiling with an aqueous solution of NaOH. Then, a mixture of the acids is precipitated from the solution by acidifying, filtered, dissolved in hot water and recrystallized (twice), then dried in vacuo.

The disadvantage of this prior method is that the process of precipitation is accompanied by tar formation, which hampers crystallization, as a result of which, the pure product compounds can be obtained only via the methyl ester thereby making the synthesis of the pure products a complicated procedure.

It is an object of the present invention to provide a less complicated method of preparing 6-(and 7-) carboxy-2-methylol-1,4-benzodioxane.

Another object of the invention is to provide a method for preparing said compounds by a shorter process cycle.

A further object of the invention is to provide an economical method involving low capital investments and operating costs.

Still another object of the invention is to reduce the cost price of the product compounds.

More specifically, the object of the present invention is to provide a method of precipitating the acids whereby tar formation is avoided, thus simplifying the entire procedure for the purification of the product compounds.

According to the invention these objects are accomplished by treating the reaction product with an aqueous solution of phosphoric acid for a period of up to 12 hours and preferably, 5–12 hours, filtering and finally purifying the acid mixture by known methods.

The present method precludes the possibility of tar formation and simplifies the purification procedure resulting from the elimination of a number of operations as indicated hereinbelow:

| Prior art method for preparing 6-(and 7-) carboxy-2-methylol-1,4-benzodioxane | Present method for preparing said product |
|---|---|
| 1. Synthesizing 6- (and 7-) carboxy-2-methylol-1,4-benzodioxane. | 1. Synthesizing 6- (and 7-) carboxy-2-methylol-1,4-benzodioxane. |
| 2. Precipitating with hydrochloric acid. | 2. Precipitating with $H_3PO_4$. |
| 3. Filtering. | 3. Filtering. |
| 4. Drying. | |
| 5. Dissolving in $CH_3OH$. | |
| 6. Esterifying with anhydrous HCl as catalyst. | |
| 7. Distilling off methyl ester. | |
| 8. Saponifying ester by boiling with NaOH. | |
| 9. Precipitating the product from solution. | |
| 10. Filtering. | |
| 11. Recrystallizing from water. | 4. Recrystallizing from water (3 or 4 times). |
| 12. Drying in vacuo. | 5. Drying in vacuo. |

The simplified purification procedure of the present invention speeds up the process, results in pure product compounds and effects a saving in both capital investment and operation costs in industrial practice.

The following example will better illustrate the invention for those skilled in the art.

EXAMPLE

One mole of protocatechuic acid having a melting point of 199.0–199.5° C. was added over 10 minutes, in an atmosphere of an inert gas, while stirring or shaking, to 1000 ml. of distilled water in which 1.25 moles of NaOH and 0.0001 mole of $Na_2SO_3$ had preliminarily been dissolved. The resulting Na-salt of protocatechuic acid was transferred to a four-necked flask equipped with a high-speed stirrer, a thermometer, an inert gas delivery tube and a dropping funnel through which 1 mole of epichlorohydrin was added over 2 hours at a temperature of 40 to 45° C. Then the mixture was allowed to stand and was stirred for 4 hours and precipitated with a solution consisting of 90 ml. $H_3PO_4$ (sp. gr. 1.74) and 90 ml. $H_2O$. After 12 hours the 6-(and 7-) carboxy-2-methylol-1,4-benzodioxane was separated by filtration. The acid was recrystallized 4 times from a minimal volume of boiling water, 4 g. of activated charcoal having been added, and the mixture was filtered hot. The product was dried in a vacuum cabinet at 30° C. The yield of the pure product was 37 percent of theory. Melting point 141–156° C.

Though the present invention has been described in accordance with a preferred embodiment, various changes and modifications may be made in carrying out the invention without departing from the spirit and scope thereof, as will easily be understood by those skilled in the art.

What is claimed is:

1. A method comprising reacting the sodium salt of protocatechuic acid with epichlorohydrin to form a first mixture of the sodium salts of 6- and 7-carboxy-2-methylol-1,4-benzodioxanes, contacting said first mixture with an aqueous solution of ortho-phosphoric acid to free the 6- and 7-carboxy-2-methylol-1,4-benzodioxanes from their sodium salts and precipitate a second mixtures of free 6- and 7-carboxy-2-methylol-1,4-benzodioxanes, separating the thusly precipitated second mixture and recrystallizing same from water.

2. A method as claimed in claim 1, wherein reacting is effected at a temperature of 40–45° C. for 2 hours using equimolar amounts of the sodium salt of protocatechuic acid and epichlorohydrin.

3. A method as claimed in claim 1, wherein the contacting of said first mixture is effected for 5–12 hours.

4. A method as claimed in claim 1, wherein the aqueous solution of ortho-phosphoric acid consists of equal volumes of water and phosphoric acid having a specific gravity of 1.74.

5. A method comprising contacting the sodium salts of 6- and 7-carboxy-2-methylol-1,4-benzodioxane with an aqueous solution of ortho-phosphoric acid to form free 6- and 7-carboxy-2-methylol-1,4-benzodioxane and recrystallizing same from water.

6. A method as claimed in claim 5, wherein contacting is effected for 5–12 hours.

7. A method as claimed in claim 5, wherein the aqueous solution of ortho-phosphoric acid consists of equal volumes of water and phosphoric acid having a specific gravity of 1.74.

References Cited

UNITED STATES PATENTS 2,699,438  1/1955  Bock et al. _____ 260—340.3 X

FOREIGN PATENTS 748,913  12/1966  Canada.

OTHER REFERENCES

Alksnis et al.: "Chemical Abstracts," vol. 59, col. 2957f (Abstract of Article taken from "Latvijas PSR Zinatnu Akad. Vestis, Kim Ser." (1962) No. 2, pp. 295–298).

ALEX MAZEL, Primary Examiner

J. H. TURNIPSEED, Assistant Examiner